United States Patent [19]

Heinen

[11] 4,097,052
[45] Jun. 27, 1978

[54] GAS-SEALED CONTACT-FREE SHAFT SEAL

[75] Inventor: Manfred Heinen, Oberhausen, Germany

[73] Assignee: Gutehoffnungshütte Sterkrade A.G., Germany

[21] Appl. No.: 664,811

[22] Filed: Mar. 8, 1976
(Under 37 CFR 1.47)

[30] Foreign Application Priority Data

Mar. 8, 1975 Germany .............................. 2510196

[51] Int. Cl.² ............................................. F16J 15/34
[52] U.S. Cl. .................................................. 277/96.2
[58] Field of Search ........................ 277/96.2, 96, 75

[56] References Cited

U.S. PATENT DOCUMENTS

| 3,502,342 | 3/1970 | Albert | 277/96.2 |
| 3,652,183 | 3/1972 | Pottharst | 277/96.2 |

Primary Examiner—Robert I. Smith
Attorney, Agent, or Firm—McGlew and Tuttle

[57] ABSTRACT

A shaft seal construction, comprises a shaft housing, with a shaft rotatably supported in the housing and having a shaft ring extending around the shaft which defines a ring seal face made of berryllium copper. A packing ring of aluminum has an annular packing ring face of an oxide of the aluminum which is engaged with the ring seal face. The packing ring is supported by a flexible closure member carried by the housing and engages with the packing and provides a gas seal with the packing ring around the shaft. The spring urges the packing ring into engagement with the shaft ring.

2 Claims, 1 Drawing Figure

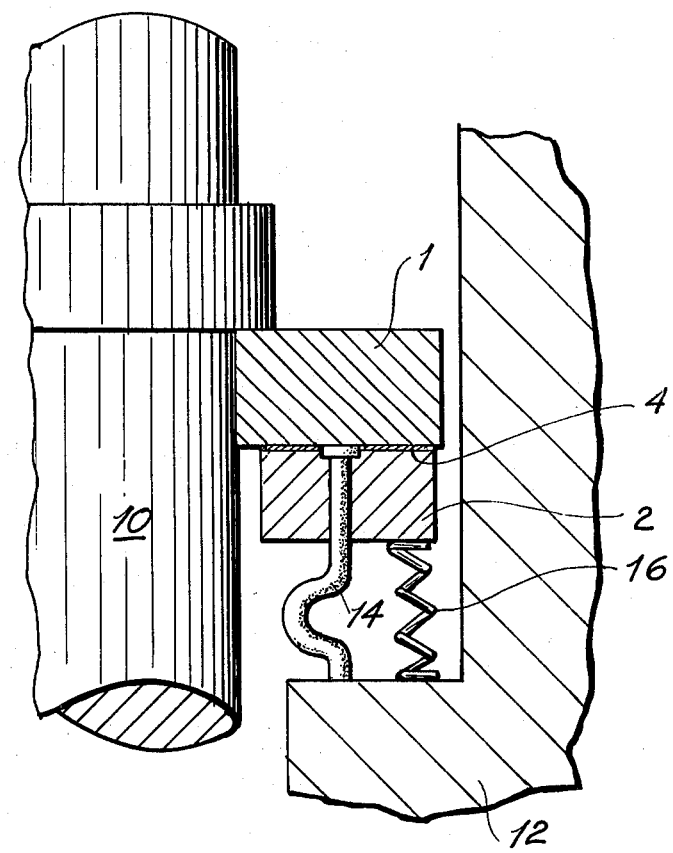

GAS-SEALED CONTACT-FREE SHAFT SEAL

FIELD AND BACKGROUND OF THE INVENTION

This invention relates in general to the construction of shaft seals and, in particular, to a new and useful gas-sealed, contact-free shaft seal for high speed shafts, in which a packing ring of aluminum has a portion of an oxide of the aluminum forming a gas-tight sealing face engaged against the sealing face of the shaft ring which is made of beryllium copper.

DESCRIPTION OF THE PRIOR ART

The present invention is particularly applicable to the sealing of shafts which run at high speeds in which a ring is mounted on the shaft and circularly embraces it to form an end ring face which is in sealing engagement with a packing ring face which is elastically suspended from the shaft housing. Such gas-sealed shaft seals are known. They become more and more important in today's mechanical engineering because they ensure, with a perfect sealing, that only very small quantities of sealing gas pass to the outside into the operational processes so that there will be very little contamination of the process gases. Such constructions must comply with the increasing requirements of modern technology which, in most cases, cannot be met by seals based on other principles.

With the small quantities of sealing gases which are used in sealing systems of this kind, only a narrow gap is left between the two sealing surfaces. A contact during operation results in a dry friction. No lubricant prevents the friction and dissipates the frictional heat. At high speeds, the relatively small sealing gas flow is not even able to dissipate the heat due to energy losses in normal, contact-free operation. This imposes high demands on the sealing ring materials. They must have satisfactory dry run properties, a good thermal conductivity to dissipate the frictional heat to the housing or the shaft and, in addition, they must be resistant to operational gases which are sometimes agressive, such as $H_2UF_6$. Aside from a corrosion resistance, they must also be stable against hydrogen embrittlement.

SUMMARY OF THE INVENTION

In accordance with the present invention, there is provided a gas-sealed shaft seal which complies with the requirements of the technology and, in contrast to the shaft seals of the prior art, is not subject to wear in the contact areas. In accordance with the invention, the shaft seal includes a shaft ring which is adapted to be secured to the shaft and which has an end face which is made of hardened beryllium copper containing from 1 to 4% of beryllium and from 0.1 to 0.5% of cobalt. A packing ring is made of aluminum, and it includes an end bearing face which bears against the shaft ring face which is provided with a hard oxide layer either over its entire surface or only over a sealing surface area and wherein the oxide layer is made from the aluminum material itself.

Accordingly, it is an object of the invention to provide an improved shaft seal in which a shaft ring and a packing seal are in bearing contact and wherein one of them includes a beryllium copper and the other comprises an aluminum having a bearing face with at least a portion of the surface made of an oxide of the aluminum material.

A further object of the invention is to provide a shaft seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

The only FIGURE of the drawing is a partial, axial sectional view of shaft seal constructed in accordance with the invention.

DESCRIPTION OF THE PREFERRED EMBODIMENT

Referring to the drawing in particular, the invention embodied therein, comprises a shaft seal construction in which a shaft 10 is rotatably mounted within a housing 12. In accordance with the invention, the shaft 10 is provided with a shaft ring 1 which extends around the complete surface of the shaft and is affixed thereto for rotation therewith and which is made of a hardened beryllium copper material. In accordance with the invention, the hardened beryllium copper material contains from 1 to 4% of beryllium and from 0.1 to 0.5% of cobalt and the balance copper.

In accordance with another feature of the invention, the shaft ring 1 includes an end bearing face at one end which is opposed by a bearing face 4 of an aluminum oxide formed from the same aluminum material as an aluminum packing ring 2. Aluminum packing ring 2 is provided with a hard oxide layer which extends either over its entire surface or only over a sealing surface area and is made of the block material itself.

The aluminum ring is carried at the end of a flexible packing material or bellows 14 which is secured to housing 12 and which also extends through and is secured in ring 2. Ring 2 is urged toward shaft ring 4 by means of a spring 16. A gas seal is maintained around the shaft 10 which produces a narrow gas cushion between the shaft ring 1 and the packing ring 2.

The combination of the hard aluminum oxide layer with the hard beryllium copper results in such an excellent antifrictional property that a seizure at an occasional contact is prevented, and the frictional heat produced during the contact as well as during a contact-free normal operation is easily dissipated through the copper to the housing or to the shaft. Both materials are resistant to corrosion and to $H_2UF_6$ and do not become embrittled in a hydrogen atmosphere either. Consequently, they constitute the best mating of materials in nuclear plants.

While a specific embodiment of the invention has been shown and described in detail to illustrate the application of the principles of the invention, it will be understood that the invention may be embodied otherwise without departing from such principles.

What is claimed is:

1. A seal for high speed shafts, comprising a shaft, a shaft ring tightly mounted on and circularly embracing the shaft, a packing ring, support means elastically suspending said packing ring in a gas-proof enclosure around said shaft, said shaft ring and said packing ring being separated by a narrow sealing gap defining a gas cushion, said shaft ring being made of hardened beryllium copper containing from 1 to 4% of beryllium and from 0.1 to 0.5% cobalt, said packing ring being of aluminum material which has a surface opposed to said shaft ring which is provided with a hard oxide layer of said aluminum extending over at least a portion of the area of said packing ring surface.

2. A shaft seal construction, comprising a shaft housing, a shaft rotatably supported in said housing, a shaft ring extending around the periphery of said shaft and defining a ring-seal face of beryllium copper at one end, a packing ring of aluminum having an annular packing ring face of an oxide of said aluminum opposed to said shaft ring seal face, a flexible closure member carried by said housing and engaged with said packing ring and providing a gas seal with said packing ring around said shaft, and spring means urging said packing ring seal face toward said shaft ring seal face, said shaft ring and said packing ring being separated by a narrow sealing gap therebetween defining a gas cushion.

* * * * *